(12) United States Patent
Cho et al.

(10) Patent No.: US 12,703,378 B2
(45) Date of Patent: Aug. 11, 2026

(54) METHOD AND APPARATUS FOR GUIDING DRIVING OF VEHICLE

(71) Applicant: HL MANDO CORPORATION, Gyeonggi-do (KR)

(72) Inventors: Yonghyun Cho, Gyeonggi-do (KR); Doheon Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 69 days.

(21) Appl. No.: 18/759,322

(22) Filed: Jun. 28, 2024

(65) Prior Publication Data

US 2025/0136136 A1 May 1, 2025

(30) Foreign Application Priority Data

Oct. 27, 2023 (KR) ........................ 10-2023-0145480

(51) Int. Cl.
*B60Q 1/00* (2006.01)
*B60W 50/14* (2020.01)
*G06V 20/58* (2022.01)

(52) U.S. Cl.
CPC ........... *B60W 50/14* (2013.01); *G06V 20/584* (2022.01); *B60W 2050/143* (2013.01); *B60W 2050/146* (2013.01); *B60W 2420/403* (2013.01); *B60W 2552/53* (2020.02)

(58) Field of Classification Search
CPC ........... B60W 50/14; B60W 2050/143; B60W 2050/146; B60W 2420/403; B60W 2552/53; B60W 40/02; B60W 2510/10; B60W 2520/10; B60W 2540/10; B60W 2540/12; B60W 2540/20; B60W 2555/60; B60W 2756/10; G06V 20/584; G08G 1/0967; G08G 1/166; B60Y 2400/90
See application file for complete search history.

(56) References Cited

U.S. PATENT DOCUMENTS

| | | | | |
|---|---|---|---|---|
| 2023/0150526 | A1* | 5/2023 | Nessler | B60W 30/146 340/435 |
| 2023/0245470 | A1* | 8/2023 | Nakatsuka | G06V 20/582 382/104 |
| 2024/0051504 | A1* | 2/2024 | Jeong | G06V 20/588 |
| 2024/0278781 | A1* | 8/2024 | Duan | H04W 4/44 |
| 2024/0428683 | A1* | 12/2024 | Fish | G08G 1/052 |
| 2025/0304104 | A1* | 10/2025 | Mitsui | B60W 60/001 |

* cited by examiner

*Primary Examiner* — Toan N Pham
(74) *Attorney, Agent, or Firm* — WOMBLE BOND DICKINSON (US) LLP

(57) ABSTRACT

A method and apparatus for guiding driving of a vehicle perform operations including obtaining, with an electronic device, image data in front of a vehicle being driven and operational data of the vehicle, when a vehicle ignition is turned on, wherein the vehicle subscribes to a driving guidance service; analyzing, with the electronic device, the image data and detecting a reference object; identifying, with the electronic device, information about driving of the vehicle based on the operational data of the vehicle; and outputting, with the electronic device, an alarm based on the reference object and the information about the driving of the vehicle.

14 Claims, 5 Drawing Sheets

METHOD AND APPARATUS FOR GUIDING DRIVING OF VEHICLE

CROSS-REFERENCE TO RELATED APPLICATION

This application claims priority to and the benefit from Korean Patent Application No. 10-2023-0145480, filed on Oct. 27, 2023, the disclosures of which is incorporated herein by reference in its entirety.

FIELD

The present disclosure generally relates to a method and apparatus for guiding driving of a vehicle.

BACKGROUND

According to statistics released by the Korea Road Traffic Corporation and the National Police Agency in 2022, intersections account for about 49% of road types, with the highest number of accidents occurring. In particular, according to the results of the traffic accident statistical analysis released by the Korea Road Traffic Authority in 2022, 55% of the accidents were caused by non-compliance with safe driving obligations, 12.1% were caused by traffic signal violations, and traffic signal violations accounted for the second-highest percentage of traffic accidents.

To reduce accidents caused by the traffic signal violations, driver assistance systems that provide a front vehicle start alert (FVSA) function are recently mounted on vehicles. The FVSA function may be deactivated when there is no preceding vehicle in the state in which a host vehicle is stopped, and may not operate when a front traffic signal changes in the state in which the host vehicle is driven.

In addition, many drivers experience a dilemma zone where it is physically impossible to immediately stop just before a stop line when a green signal changes from a yellow signal, so they continue driving and inevitably end up violating the signal.

SUMMARY

According to some embodiments of the present disclosure, a method and apparatus for guiding driving of a vehicle can provide a driving alarm according to a traffic signal change even when a preceding vehicle does not exist in front of a stopped host vehicle by identifying or considering a traffic signal as well as internal data of the vehicle.

In addition, according to certain embodiments of the present disclosure, a method and apparatus for guiding driving of a vehicle can provide a stopping alarm according to the presence or absence of a stop line and a signal change so that the host vehicle being driven can stop at an appropriate time by identifying or considering all of a traffic signal, internal data of the vehicle, and the stop line.

Additionally, according to some embodiments of the present disclosure, a method and apparatus for guiding driving of a vehicle can selectively provide a service to a user based on subscription of a driving guidance service for a vehicle providing a driving and stopping alarm of the vehicle.

A method for guiding driving of a vehicle according to an embodiment of the present disclosure may include obtaining, with an electronic device, image data about the front of a vehicle being driven and internal data of the vehicle, when a vehicle ignition is turned on, wherein the vehicle subscribes to a driving guidance service; analyzing, with the electronic device, the image data and detecting a reference object; identifying, with the electronic device, a driving information based on the vehicle's internal data; and outputting, with the electronic device, an alarm based on the reference object and the driving information.

In addition, the method may further include after the outputting an alarm, transmitting, the electronic device, the image data to a cloud server to perform learning on the reference object identified in the image data.

In addition, the method may further include after the outputting an alarm, transmitting, the electronic device, the vehicle's internal data to the cloud server to perform learning on a relationship between the reference object and the vehicle's internal data.

In addition, the detecting a reference object may include detecting the reference object comprising a traffic lamp and a stop line included in the image data through analysis of the image data.

In addition, the obtaining internal data of the vehicle may include obtaining the internal data of the vehicle comprising a vehicle speed of the vehicle, whether a brake pedal is input, whether an acceleration pedal is input, whether a turn traffic lamp is activated, a transmission information, and whether a preceding vehicle is present.

In addition, the identifying a driving information of the vehicle may include identifying a driven state, stopped state, and decelerated state of the vehicle.

In addition, the identifying a driving information of the vehicle may include identifying the driving information related to the straight ahead or left-turn of the vehicle based on whether the turn traffic lamp of the vehicle is activated.

In addition, the outputting an alarm may include identifying whether a driving signal is turned off in the traffic lamp when the vehicle is in the driven state; identifying whether the stop line is present when the driving signal is turned off; and outputting a stopping alarm of the vehicle when the stop line is present.

In addition, the outputting an alarm may include identifying whether a driving signal is turned on in the traffic lamp when the vehicle is in the stopped state; and outputting the starting alarm of the vehicle when the driving signal is turned on.

In addition, the method may further include after the detecting a reference object, identifying whether the vehicle is in an exceptional situation based on the vehicle's internal data.

In addition, according to an embodiment of the present disclosure, an apparatus for guiding driving of a vehicle, may include a camera for obtaining image data about the front of the vehicle being driven when a vehicle ignition is turned on, wherein the vehicle subscribes to a driving guidance service; a sensor for obtaining internal data of the vehicle being driven; and a controller configured to analyze the image data, detect a reference object, identify driving information based on the vehicle's internal data, and output an alarm based on the reference object and the driving information.

In addition, the controller may transmit the image data to a cloud server to perform learning on the reference object identified in the image data.

In addition, the controller may transmit the internal data of the vehicle to the cloud server to perform learning on a relationship between the reference object and the vehicle's internal data.

In addition, the reference object may include a traffic lamp and a stop line included in the image data.

In addition, the vehicle's internal data may include a vehicle speed of the vehicle, whether a brake pedal is input, whether an acceleration pedal is input, whether a turn traffic lamp is activated, a transmission information, and whether a preceding vehicle is present.

In addition, the controller may identify the driving information including a driven state, stopped state, and decelerated state of the vehicle.

In addition, the controller may identify the driving information related to the straight ahead or left-turn of the vehicle based on whether the turn traffic lamp of the vehicle is activated.

In addition, the controller may identify whether a driving signal is turned off in the traffic lamp when the vehicle is in the driven state, identify whether the stop line is present when the driving signal is turned off, and output a stopping alarm of the vehicle when the stop line is present.

In addition, the controller may identify whether a driving signal is turned on in the traffic lamp when the vehicle is in the stopped state, and output the starting alarm of the vehicle when the driving signal is turned on.

In addition, the controller may identify whether the vehicle is in an exceptional situation based on the vehicle's internal data.

As described above, a method and apparatus for guiding driving of a vehicle according to some embodiments of the present disclosure may reduce an accident caused by a traffic signal violation by providing a driving alarm according to traffic signal change even when a preceding vehicle does not exist in front of a stopped host vehicle by identifying or considering both a traffic signal and internal data of the vehicle.

In addition, a method and apparatus for guiding driving of the vehicle according to certain embodiments of the present disclosure may reduce an accident occurring in a dilemma zone by providing a stopping alarm according to the presence or absence of a stop line and a signal change so that the host vehicle being driven can stop at an appropriate time by identifying all of the traffic signal, internal data of the vehicle, and the stop line.

Additionally, a method and apparatus for guiding driving of the vehicle according to some embodiments of the present disclosure may provide a subscription for a driving guidance service for a vehicle providing a driving and stopping alarm of the vehicle, thereby selectively providing a service to only a user who subscribes a corresponding service.

DETAILED DESCRIPTION

Figure 1:
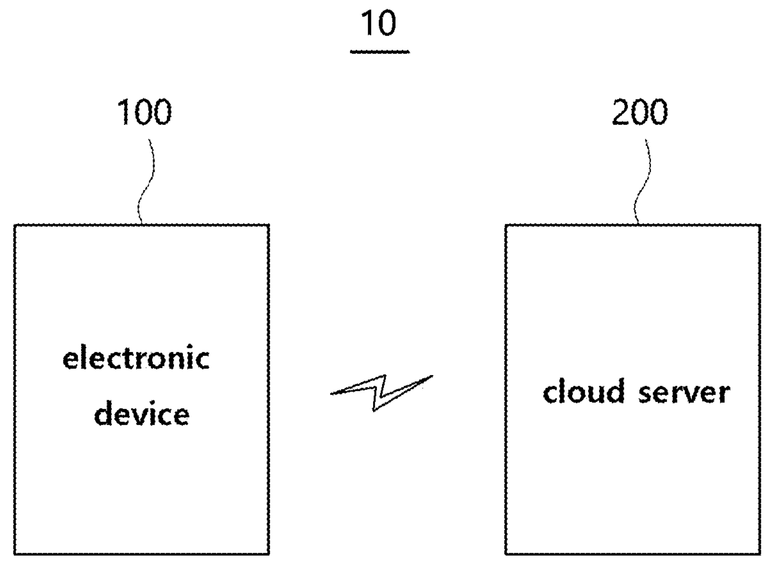
FIG. 1 is a block diagram showing a main configuration of a system for performing driving guidance of a vehicle according to an embodiment of the present disclosure.

Hereinafter, preferred embodiments of the present disclosure will be described in detail with reference to the accompanying drawings. The detailed description to be disclosed below together with the accompanying drawings is intended to describe exemplary embodiments of the present disclosure, and is not intended to represent the only embodiments in which the present disclosure can be practiced. In the drawings, parts not related to the description may be omitted in order to clearly describe the present disclosure, and the same reference numerals may be used for the same or similar components throughout the specification.

FIG. 1 is a block diagram showing a main configuration of a system for performing driving guidance of a vehicle according to an embodiment of the present disclosure.

Referring to FIG. 1, a system 10 according to an embodiment of the present disclosure may include an electronic device 100 and a cloud server 200.

The electronic device 100 may be an electronic device mounted to a vehicle and can access the cloud server 200 to subscribe to an intersection driver attention warning (iDAW) service. The electronic device 100 detects a reference object from image data about the front-facing view of the host vehicle being driven, obtains internal data of the host vehicle being driven to identify the driving information of the host vehicle, and outputs an alarm based on the reference object and the driving information. This will be described in more detail in the following with reference to FIG. 2.

The cloud server 200 receives the image data about the front-facing view of the vehicle being driven and the internal data of the vehicle being driven obtained by the electronic device 100 through communication with the electronic device 100. The cloud server 200 may learn the types of signals constituting the traffic lamp and the order in which the signals change by training the image data. In addition, the cloud server 200 may train the image data and the vehicle's internal data to learn which data of the vehicle's internal data changes depending on the changes occurred in the traffic lamp. To this end, the cloud server 200 may store artificial intelligence algorithms and machine learning algorithms.

Figure 2:
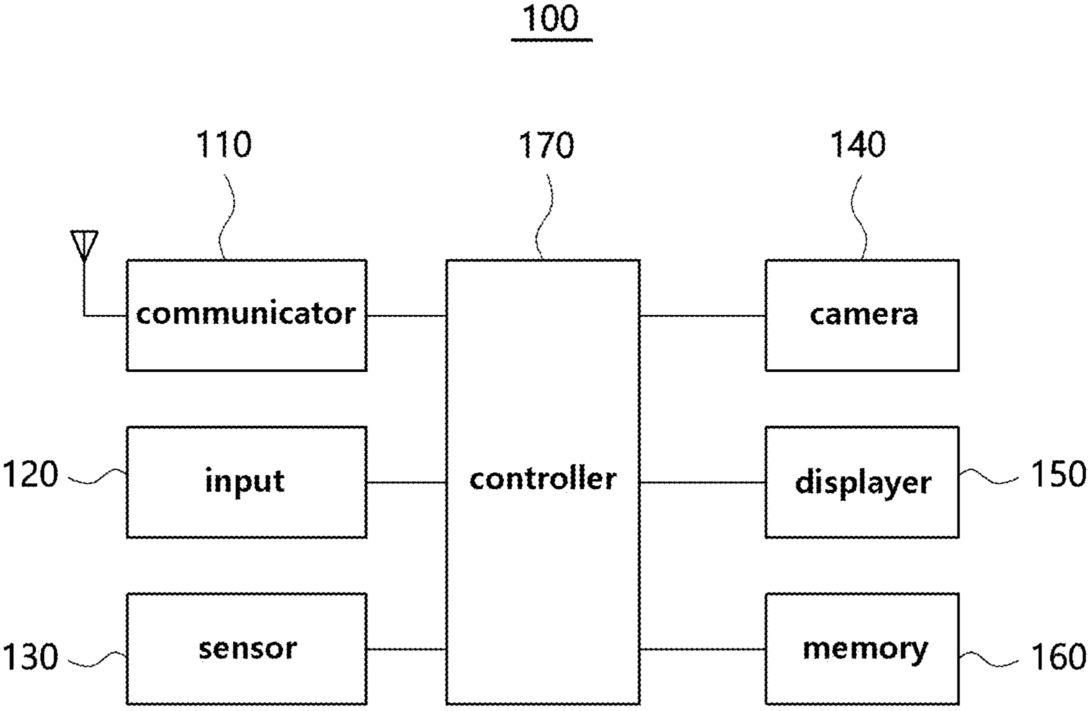
FIG. 2 is a block diagram showing a main configuration of an electronic device configured to perform driving guidance of a vehicle according to an embodiment of the present disclosure.

FIG. 2 is a block diagram showing a main configuration of an electronic device configured to perform driving guidance of a vehicle according to an embodiment of the present disclosure.

Referring to FIG. 2, an electronic device 100 according to an embodiment of the present disclosure may include a communicator 110, an input 120, a sensor 130, a camera 140, a display 150, a memory 160, and a controller 170.

The communicator 110 may provide the vehicle's internal data and image data obtained through communication with the sensor 130 and the camera 140 to the controller 170. To this end, the communicator 110 may perform communications such as CAN (controller area network), NFC (near field communication), Zigbee, and may perform serial communications such as RS-232.

In addition, the communicator 110 may transmit the vehicle's internal data and image data to the cloud server 200 through communication with the cloud server 200. To this end, the communicator 110 may perform wireless communications such as 5G (5th generation communication), LTE-A (long term evolution-advanced), LTE, and Wi-Fi (wireless fidelity).

The input 120 generates input data in response to a user's input of the vehicle. To this end, the input 120 may include, for example, but not limited to, a microphone, a keypad, a dome switch, a touch panel, a touch key, and a button.

The sensor 130 may may be implemented as a plurality of sensors for obtaining host vehicle's internal data including a vehicle speed of the vehicle being driven, an input of a brake pedal, an input of an acceleration pedal, activation of a turn traffic lamp, a transmission information, and presence of a preceding vehicle. The sensor 130 may provide the obtained vehicle internal data to the controller 170.

The camera 140 is mounted to the vehicle and obtains image data about the environment outside or around the vehicle. In particular, the camera 140 may obtain image data about the front-facing view of the vehicle being driven and provide the image data to the controller 170.

The display 150 displays display data related to operations performed in the electronic device 100. The display 150 includes, for example, but not limited to, a liquid crystal display (LCD), a light emitting diode (LED) display, an organic LED (OLED) display, a micro electromechanical system (MEMS) display, and an electronic paper display. The display 150 may be combined with the input 120 and implemented as a touch screen capable of inputting and outputting information.

The memory 160 stores an operation program for operating the electronic device 100. In particular, the memory 160 may store an algorithm for analyzing the image data obtained while the vehicle is driven. For example, the memory 160 may store an algorithm such as YOLO (you only look once), which is a deep learning algorithm for detecting a traffic lamp in image data, an algorithms for performing HSV (hue, saturation, value) transformation, canny edge detection, and hough line transformation for detecting a stop line in image data.

When the vehicle ignition is turned on, the controller 170 may identify whether the host vehicle is a vehicle subscribing to a driving guidance service. When the host vehicle is a vehicle subscribing to the driving guidance service, the controller 170 receives the image data obtained by the camera 140 and performs analysis of the image data. The controller 170 may receive the vehicle's internal data obtained by the sensor 130 through communication with the sensor 130. For instance, the host vehicle's internal data may include a vehicle speed of the vehicle, an input of a brake pedal, an input of an acceleration pedal, activation of a turn traffic lamp, transmission information, and presence of the preceding vehicle.

When a reference object including a traffic lamp and a stop line is detected in the image data as a result of the analysis of the image data, the controller 170 determines whether the vehicle is in an exceptional situation based on the identified vehicle internal data. The exceptional situation may include, for example, but not limited to, a state in which a right-turn traffic lamp is turned on, a state in which an emergency lamp is turned on, a state in which the transmission is placed in P (parking), and a state in which the preceding vehicle exists in front of the host vehicle.

When the vehicle is not in the exceptional situation, the controller 170 may determine vehicle's driving information that may identify whether the vehicle is currently in any one of a driven state, a stopped state, and a decelerated state. To this end, the controller 170 may determine the vehicle's driving information by identifying the vehicle speed of the vehicle, a state whether the brake pedal is input, and a state whether the acceleration pedal is input in the vehicle's internal data.

The controller 170 may provide an alarm related to vehicle driving to the driver. More specifically, when it is confirmed that the vehicle is in the driven state, the controller 170 identifies whether the driving signal is turned off in the traffic lamp identified in the image data. In this case, the driving signal may be a straight ahead signal or a left-turn signal. If the driving signal is turned off while the vehicle is in the driven state, the controller 170 identifies whether the stop line exists in the image data of the vehicle being driven. As described above, when the vehicle is in the driven state, the driving signal is turned off and a stop line exists in the image data, the controller 170 provides a stop alarm so that the driver may stop the vehicle.

Through this, when the vehicle is driving for left-turn or driving for straight ahead, an embodiment of the present disclosure may enable the driver to safely stop the vehicle according to the signal without violating the signal if the traffic lamp is changed from the driving signal to the speed down signal (e.g. yellow signal) and the stopping signal (e.g. red signal) and the stop line exists in a traveling direction of the vehicle.

In addition, when it is identified that the vehicle is in the stopped state, the controller 170 confirms or determines whether the driving signal is turned on in the traffic lamp identified in the image data. As described above, when the driving signal is turned on while the vehicle is stopped, the controller 170 outputs or provides a starting alarm so that the driver may drive the vehicle.

Through this, an exemplary embodiment of the present disclosure may allow the driver to drive safely according to a signal when a traffic lamp changes from a stopping signal to a driving signal (green signal or left-turn signal) while the vehicle is stopped at the signal waiting line for left-turn or straight ahead.

However, if the vehicle is in a decelerated state, the controller 170 may not provide a separate alarm.

The controller 170 transmits the obtained image data and vehicle's interior data to the cloud server 200 so that the cloud server 200 may learn the types of signals constituting the traffic lamp and the order in which the signals change, and learn changes in the vehicle's interior data generated depending on the changes in the traffic lamp based on the image data and the vehicle's interior data.

Figure 3:
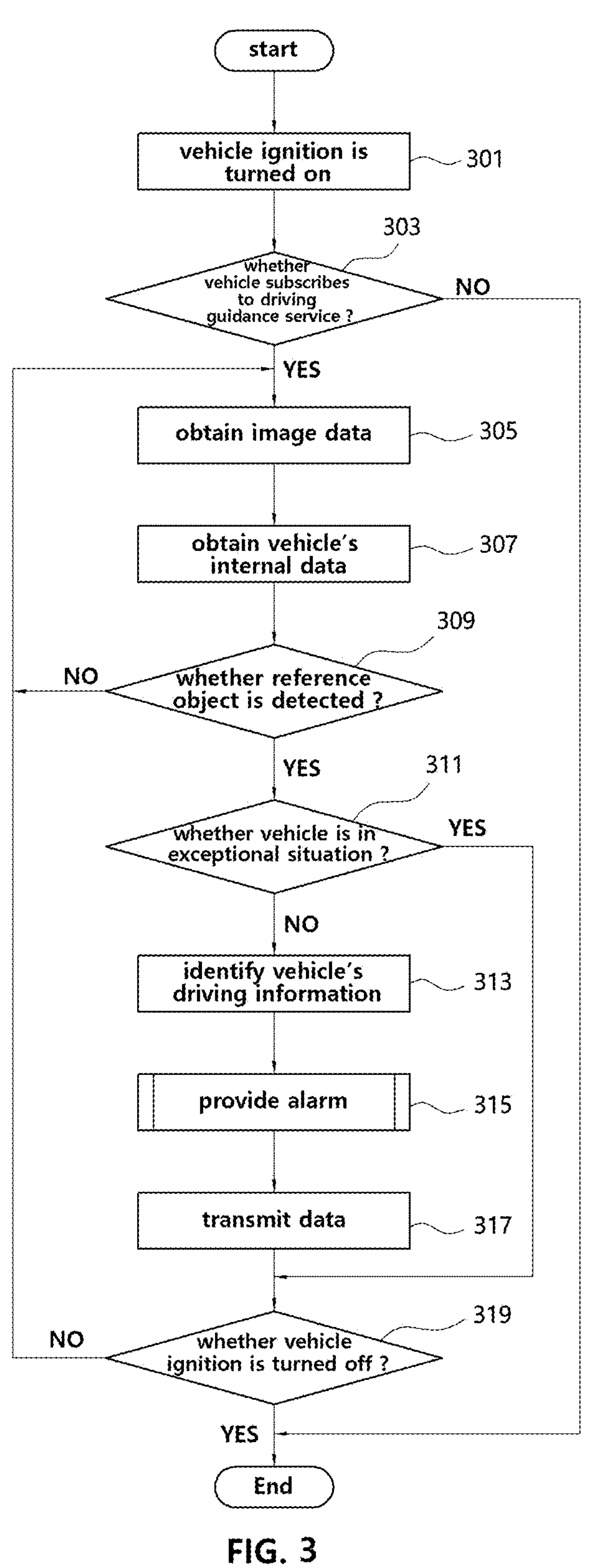
FIG. 3 is a flowchart for illustrating a method of performing driving guidance of a vehicle according to an embodiment of the present disclosure.

FIG. 3 is a flowchart for illustrating a method of performing driving guidance of a vehicle according to an embodiment of the present disclosure.

Referring to FIG. 3, in Step 301, vehicle ignition is turned on. In Step 303, when the vehicle ignition is turned on, the controller 170 may identify whether the vehicle is a vehicle subscribing to the driving guidance service. As a result of the identification in Step 303, if the vehicle is a vehicle subscribing to the driving guidance service, the controller 170 performs Step 305, and if the vehicle is not a vehicle subscribing to the driving guidance service, the process of performing driving guidance of the vehicle is terminated.

In Step 305, the controller 170 receives the image data obtained by the camera 140 and performs analysis of the image data, and performs Step 307. In Step 307, the controller 170 may receive the vehicle's internal data obtained by the sensor 130 through communication with the sensor 130. In this case, the vehicle's internal data may include a vehicle speed of the vehicle, a state of whether a brake pedal is input, a state of whether an acceleration pedal is input, a state of whether a turn traffic lamp is activated, transmission information, and a state of whether the preceding vehicle is present.

In Step 309, the controller 170 analyzes the image data and determines whether the reference object is detected in the image data. The controller 170 may perform Step 311 when the image data is analyzed and the reference object is detected in the image data, and return to Step 305 when the reference object is not detected, and continuously perform Steps 305 and 307. In this case, the reference object may include a traffic lamp and a stop line.

In Step 311, the controller 170 identifies whether the vehicle is in an exceptional situation based on the vehicle's internal data identified in step 307. At Step 311, the exceptional situation may include, for example, but not limited to, a state in which the right-turn traffic lamp is turned on, a state in which the emergency lamp is turned on, a state in which the transmission is placed in P (parking), and a state in which the preceding vehicle exists in front of the host vehicle. As a result of the identification in Step 311, if the vehicle is in an exceptional situation, Step 319 is performed, and if the vehicle is not in an exceptional situation, Step 313 is performed.

In Step 313, the controller 170 identifies vehicle's driving information and performs Step 315. In this case, the vehicle's driving information may be information on whether the vehicle is currently in any one of the driven state, stopped state, and decelerated state. To this end, the controller 170 may identify the vehicle's driving information by identifying the vehicle speed of the vehicle, whether the brake pedal is input, and whether the acceleration pedal is input in the vehicle's internal data.

Figure 4:
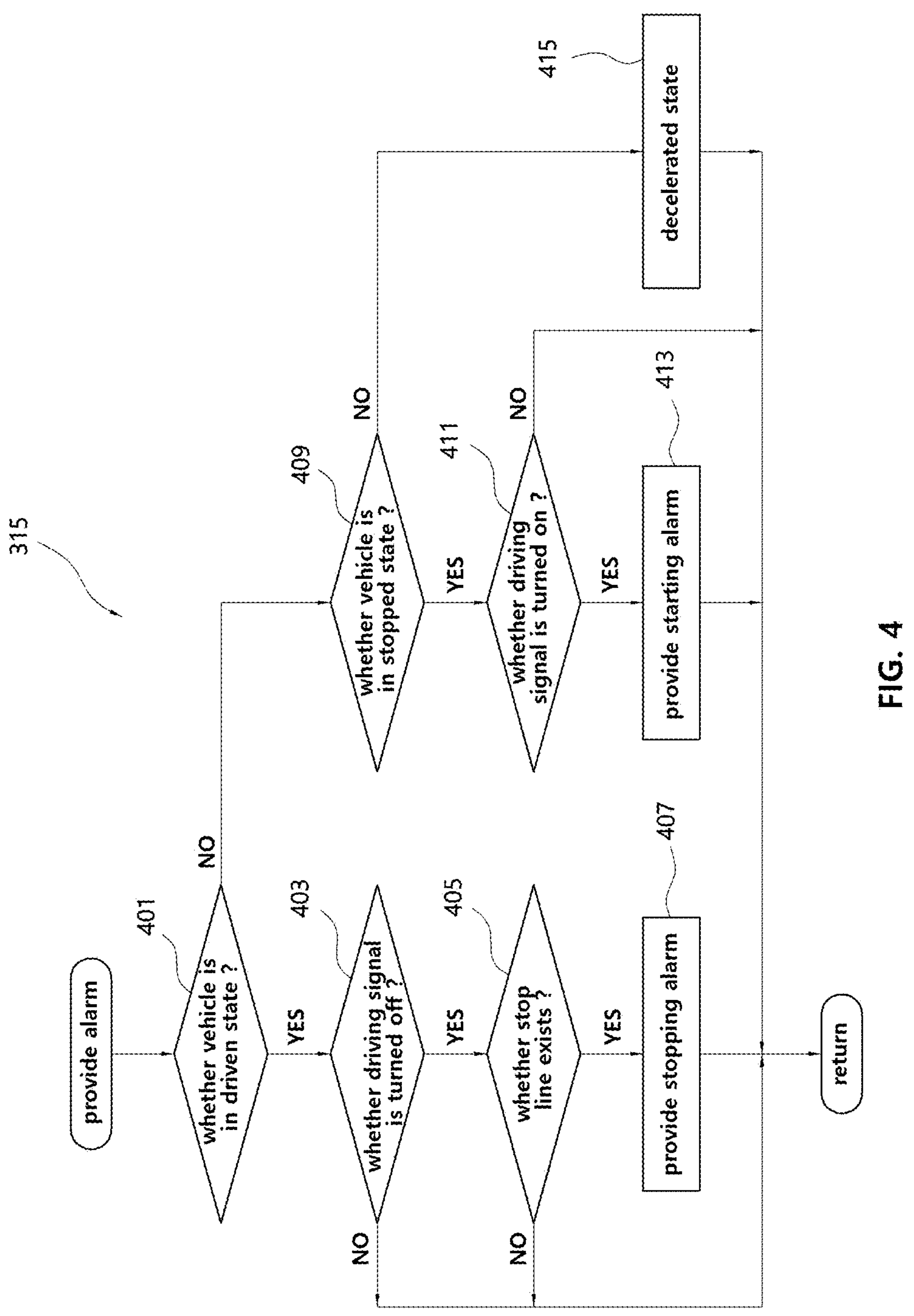
FIG. 4 is a detailed flowchart for illustrating a method of providing an alarm for driving guidance of a vehicle according to an embodiment of the present disclosure.

In Step 315, the controller 170 may provide or output the alarm related to vehicle driving to the driver. This will be described in more detail with reference to FIG. 4. FIG. 4 is a detailed flowchart for illustrating a method of providing an alarm for driving guidance of a vehicle according to an embodiment of the present disclosure.

Referring to FIG. 4, in Step 401, when it is identified that the vehicle is in a driven state, the controller 170 performs Step 403. In Step 403, the controller 170 determines whether the driving signal is turned off in the traffic lamp identified in the image data. In this case, the driving signal may be a straight ahead signal or a left-turn signal.

When the driving signal is turned off when the vehicle is in a driven state as a result of the identification in Step 403, the controller 170 performs Step 405. In Step 405, the controller 170 performs Step 407 when the driving signal is turned off, the vehicle is in the driven state and the stop line exists in the image data. As described above, when the driving signal is turned off, the vehicle is in the driven state, and the stop line exists in the image data, the controller 170 may provide a stopping alarm to allow the driver to stop the vehicle in Step 407 and return to Step 317 of FIG. 3.

Through this, when the vehicle is driving for left-turn or driving for straight ahead, an embodiment of the present disclosure may enable the driver to safely stop according to the signal without violating the signal if the traffic lamp is changed from the driving signal to the speed down signal (e.g. yellow signal) and the stopping signal (e.g. red signal) and the stop line exists in a traveling direction of the vehicle. In addition, in Step 403, the controller 170 may return to Step 317 of FIG. 3 when the driving signal is not identified to be turned off and the stop line is not identified in Step 405.

When it is identified that the vehicle is not in a driven state in Step 401, the controller 170 performs Step 409. In Step 409, when it is identified that the vehicle is in the stopped state, the controller 170 may perform Step 411 and when it is identified that it is not in the stopped state, the controller 170 may perform Step 415.

In Step 411, the controller 170 performs Step 413 when the driving signal is turned on while the vehicle is in a stopped state. As described above, when the driving signal is turned on in a state where the vehicle is stopped, in step 413, the controller 170 may output or provide a starting alarm to allow the driver to drive the vehicle and return to Step 317 of FIG. 3.

Through this, an embodiment of the present disclosure may allow the driver to drive safely according to a signal when a traffic lamp changes from a stopping signal to a driving signal (e.g. green signal or left-turn signal) in a state where the vehicle is stopped at the signal waiting line for left-turn or straight ahead. In addition, in Step 411, the controller 170 may return to Step 317 of FIG. 3 when the driving signal is not identified to be turned on.

If it is identified that the vehicle is not in the stopped state in Step 409, the controller 170 performs Step 415. In Step 415, the controller 170 identifies that the vehicle is in the decelerated state and returns to Step 317 of FIG. 3.

Then, in Step 317, the controller 170 transmits the image data and vehicle's internal data obtained in Steps 305 and 307 to the cloud server 200. In this case, the cloud server 200 may learn the types of signals constituting the traffic lamp and the order in which the signals change based on the image data, and may learn changes in the vehicle's internal data generated depending on the changes in the traffic lamp based on the image data and the vehicle's internal data.

In Step 319, the controller 170 detects that the vehicle ignition is turned off. When the vehicle ignition is turned off, the controller 170 may terminate the process, and when the vehicle ignition is not turned off, the controller 170 may perform Steps 305 to 317 again.

Figure 5:
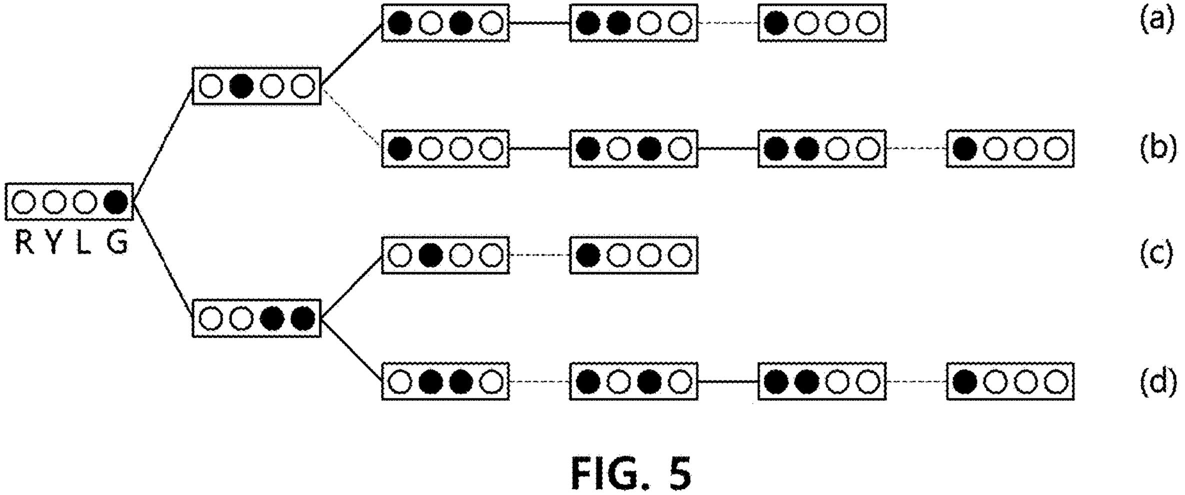
FIGS. 5 to 7 are diagrams showing examples of the order of providing an alarm in accordance with the change of a traffic signal in a four-colored traffic lamp according to an embodiment of the present disclosure.
Figure 6:
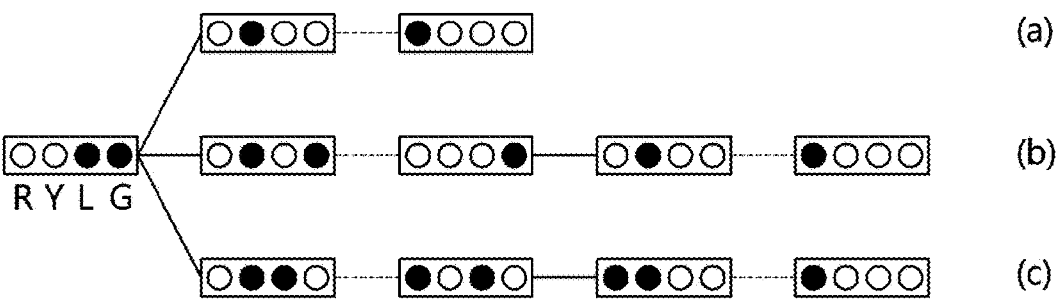
Figure 7:
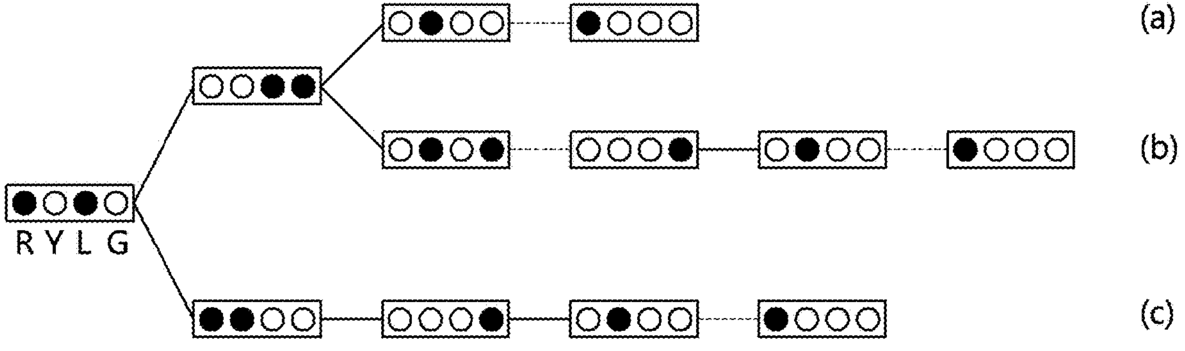

FIGS. 5 to 7 are diagrams showing examples of the order of providing an alarm in accordance with the change of a traffic signal in a four-colored traffic lamp according to an embodiment of the present disclosure.

FIGS. 5 to 7 show examples in which traffic signals are changed by different orders in the four-colored traffic lamp, where R represents a red signal, Y represents a yellow signal, L represents a left-turn signal, and G represents a straight ahead signal. In consideration of the image data and the vehicle's internal data together, the controller 170 may determine the vehicle intends to turn left when the left-turn blinker is turned on in a state where the traffic lamp and stop line are identified in the image data, and determine that the vehicle intends to proceed straight ahead when the left-turn blinker is not turned on in a state where the traffic lamp and stop line are identified. In addition, when the traffic lamp indicated by a solid line in FIGS. 5 to 7 changes, an alarm related to driving guidance may be provided to the driver, and when the traffic light indicated by a dotted line changes, a separate alarm may be not provided to the driver.

As shown in (a) of FIG. 5, when the green signal is turned off and the yellow signal is turned on in a state in which the green signal is turned on, the controller 170 may provide a stopping alarm for stopping the vehicle to the driver. When the yellow signal is turned on in a state where the left-turn blink is turned on, and the red signal and the left-turn signal are turned on together, the controller 170 may provide a driving alarm for driving the vehicle to the driver to drive in a left-turn. In addition, when the left-turn signal is turned off in a state where the left-turn blink is turned on, the controller 170 may provide a stopping alarm to the driver.

As shown in (b) of FIG. 5, when the green signal is turned off and the yellow signal is turned on in a state where the green signal is turned on, the controller 170 may provide a stopping alarm to the driver. In addition, the controller 170 does not provide a separate alarm when the yellow signal is turned off and the red signal is turned on. In addition, the controller 170 may provide a driving alarm to the driver to drive in a left-turn when the left-turn signal is turned on in a state where the left-turn blink is turned on. In addition, when the left-turn signal is turned off in a state where the left-turn blink is turned on, the controller 170 may provide a stopping alarm to the driver.

As shown in (c) of FIG. 5, the controller 170 may provide a driving alarm to the driver when the left-turn signal is turned on in a state where the green signal is turned on and the left-turn blink is turned on. When the green signal and the left turn signal are turned off and the yellow signal is turned on in a state where the left-turn blink is turned on, the controller 170 may provide a stop alarm to the driver.

As shown in (d) of FIG. 5, the controller 170 may provide a driving alarm to the driver when the left-turn signal is turned on in a state where the green signal is turned on and the left-turn blink is turned on. When the green signal is turned off and the yellow signal is turned on in a state where the left-turn blink is not turned on, the control unit 170 may provide a stopping alarm to the driver who is driving straight ahead. In addition, when the left-turn signal is turned off and the yellow signal is turned on in the state where the left-turn blink is turned on, the controller 170 may provide a stopping alarm to the driver.

As shown in (a) of FIG. 6, the controller 170 may provide a stopping alarm to the driver who wants to drive straight ahead or turn left when the left-turn signal and the green signal are turned off and the yellow signal is turned on in the state where the left-turn signal and the green-signal are turned on.

As shown in (b) of FIG. 6, when the left-turn signal is turned off and the yellow signal is turned on in the state where the left-turn signal and the green signal are turned on, the controller 170 may provide a stopping alarm to the driver who wants to turn left. Subsequently, when the green signal is turned off and the yellow signal is turned on, the controller 170 may provide a stopping alarm to the driver who wants to drive straight ahead.

As shown in (c) of FIG. 6, the controller 170 may provide a stopping alarm to the driver who wants to drive straight ahead when the green signal is turned off and the yellow signal is turned on in the state where the left-turn signal and the green signal are turned on. When the left-turn signal is turned off and the yellow signal is turned on in the state where the red signal and the left-turn signal are turned on, the controller 170 may provide a stopping alarm to the driver who wants to turn left.

As shown in (a) of FIG. 7, in the state where the red signal and the left-turn signal are turned on, the controller 170 may provide the starting alarm to the driver when the red signal is turned off and the green signal is turned on. When the left-turn signal and the green signal are turned off and the yellow signal is turned on, the control unit 170 may provide a stopping alarm to the driver who wants to drive straight ahead or turn left.

As shown in (b) of FIG. 7, the controller 170 may provide the starting alarm to the driver when the red signal is turned off and the green signal is turned on in the state where the red signal and the left-turn signal are turned on. When the left-turn signal is turned off and the yellow signal is turned on, the controller 170 may provide a stopping alarm to the driver who wants to turn left. When the green signal is turned off and the yellow signal is turned on in a state where only the green signal is turned on, the controller 170 may provide a stopping alarm to the driver.

As shown in (c) of FIG. 7, when the left-turn signal is turned off and the yellow signal is turned on in a state where the red signal and the left-turn signal are turned on, the controller 170 may provide a stopping alarm to the driver who wants to turn left. When the red signal and the yellow signal are turned off and the green signal is turned on, the controller 170 may provide a starting alarm to the driver who wants to drive straight ahead. The controller 170 may provide a stopping alarm to the driver when the green signal is turned off and the yellow signal is turned on in a state where the green signal is turned on.

FIGS. 5 to 7 illustrate signal changes in a four-colored traffic light as an example, and the present disclosure is not necessarily limited thereto. It is clarified that it can be applied to all traffic lamps used on the road, such as three-colored traffic lamp and five-colored traffic lamp that indicate various directions of driving.

The embodiments of the present disclosure disclosed in the specification and the drawings are merely provided by way of illustrating specific examples for easy description of the technical content of the present disclosure and helping to understand the present disclosure, and are not intended to limit the scope of the present disclosure. Accordingly, it should be interpreted that all changes or modifications derived from the technical idea of the present disclosure fall within the scope of the present disclosure in addition to the embodiments disclosed herein.

What is claimed is:

1. A method for guiding driving of a vehicle, the method comprising:

obtaining image data in front of a vehicle and operational data of the vehicle, wherein the vehicle subscribes to a driving guidance service;

detecting a reference object by analyzing the image data in front of the vehicle;

identifying information about driving of the vehicle based on the operational data of the vehicle; and outputting an alarm based on the reference object and the information about the driving of the vehicle, wherein the detecting of the reference object comprises:

detecting the reference object comprising a traffic lamp and a stop line included in the image data in front of the vehicle by analyzing the image data in front of the vehicle, wherein the information about the driving of the vehicle is one of a driven state, a stopped state, and a decelerated state of the vehicle, wherein the outputting of the alarm comprises:

when the vehicle is in the driven state, identifying whether a traffic signal allowing driving is turned off in the traffic lamp;

when the traffic signal allowing the driving is turned off, identifying whether the stop line is present in front of the vehicle; and when the stop line is present in front of the vehicle, outputting an alarm for stopping the vehicle.

2. The method of claim 1, further comprising:

after or when the alarm is output, transmitting the image data to a cloud server to perform learning on the reference object detected in the image data in front of the vehicle.

3. The method of claim 2, further comprising:

after or when the alarm is output, transmitting the operational data of the vehicle to the cloud server to perform learning on a relationship between the reference object and the operational data of the vehicle.

4. The method of claim 1, wherein the operational data of the vehicle comprises a vehicle speed of the vehicle, a input of a brake pedal, an input of an acceleration pedal, activation of a turn traffic lamp of the vehicle, a transmission information, and a status of whether a preceding vehicle is present.

5. The method of claim 1, wherein the identifying of the information about the driving of the vehicle comprises:

identifying the information about the driving of the vehicle related to straight forward drive or left-turn of the vehicle based on whether a turn traffic lamp of the vehicle is activated.

6. The method of claim 5, wherein the outputting of the alarm comprises:

when the vehicle is in the stopped state, identifying whether a traffic signal allowing driving is turned on in the traffic lamp; and outputting an alarm of the vehicle for starting driving.

7. The method of claim 1, further comprising:

after the detecting of the reference object, identifying whether the vehicle is in an exceptional situation based on the operational data of the vehicle.

8. An apparatus for guiding driving of a vehicle, the apparatus comprising:

a camera configured to generate image data in front of the vehicle, wherein the vehicle subscribes to a driving guidance service;

a sensor configured to generate operational data of the vehicle; and a controller configured to detect a reference object by analyzing the image data of the camera, identify information about driving of the vehicle based on the operational data of the vehicle, and output an alarm based on the reference object and the information about driving of the vehicle, wherein the reference object comprises a traffic lamp and/or a stop line included in the image data, wherein the information about the driving of the vehicle is one of a driven state, a stopped state, and a decelerated state of the vehicle, wherein the controller is configured to:

when the vehicle is in the driven state, identify whether a traffic signal allowing driving is turned off in the traffic lamp;

when the traffic signal allowing the driving is turned off, identify whether the stop line is present in front of the vehicle; and when the stop line is present in front of the vehicle, output an alarm of the vehicle for starting driving.

9. The apparatus of claim 8, wherein the controller is configured to, after or when the alarm is output, transmit the image data to a cloud server to perform learning on the reference object detected in the image data in front of the vehicle.

10. The apparatus of claim 9, wherein the controller is configured to, after or when the alarm is output, transmit the operational data of the vehicle to the cloud server to perform learning on a relationship between the reference object and the operational data of the vehicle.

11. The apparatus of claim 8, wherein the operational data of the vehicle comprises a vehicle speed of the vehicle, a input of a brake pedal, an input of an acceleration pedal, activation of a turn traffic lamp of the vehicle, a transmission information, and a status of whether a preceding vehicle is present.

12. The apparatus of claim 8, wherein the controller is configured to identify information about the driving of the vehicle related to straight forward drive or left-turn of the vehicle based on whether a turn traffic lamp of the vehicle is activated.

13. The apparatus of claim 12, wherein the controller is configured to:

when the vehicle is in the stopped state, identify whether a traffic signal allowing driving is turned on in the traffic lamp; and output an alarm of the vehicle for starting driving.

14. The apparatus of claim 8, wherein the controller is configured to identify whether the vehicle is in an exceptional situation based on the operational data of the vehicle.

* * * * *